Nov. 27, 1945.         J. K. SPEICHER         2,389,940
MOLDING COMPOSITIONS
Filed May 1, 1942
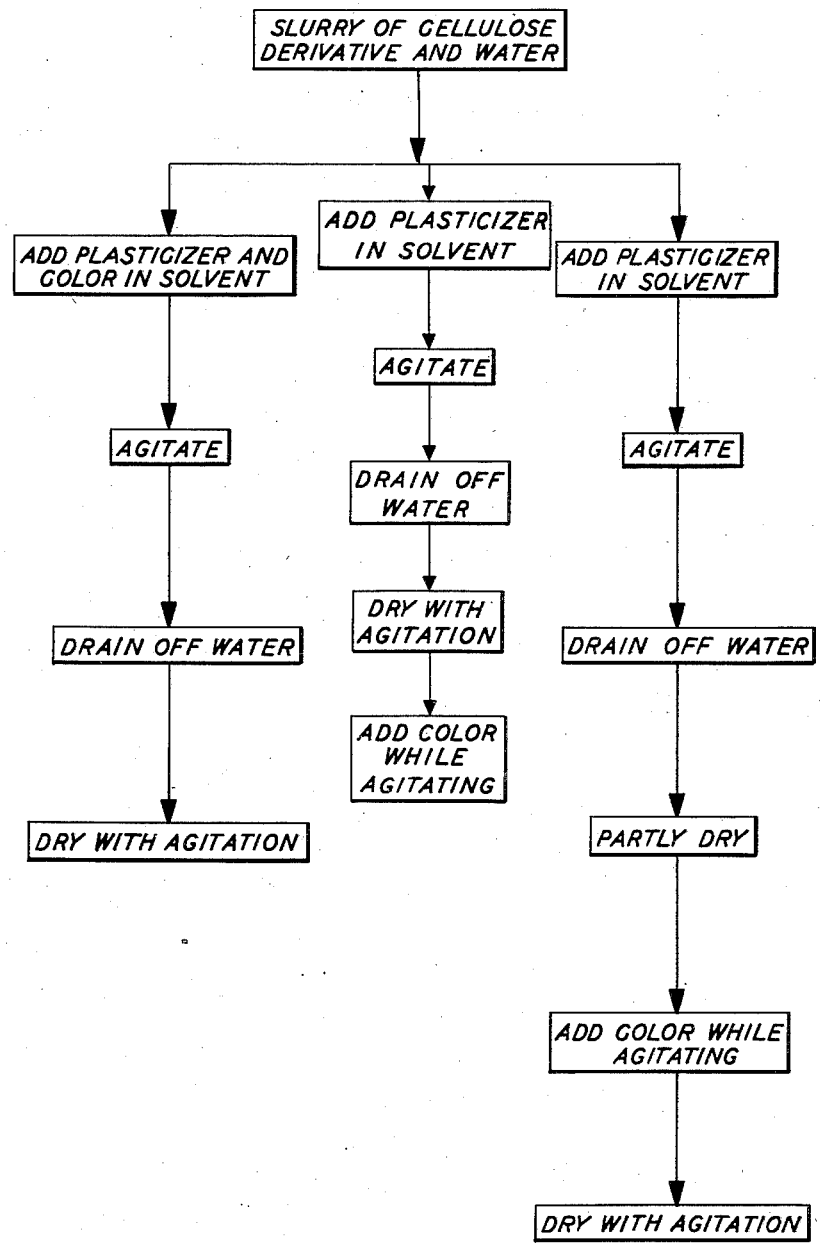
INVENTOR.
JOHN K. SPEICHER
BY
ATTORNEY Patented Nov. 27, 1945

2,389,940

UNITED STATES PATENT OFFICE 2,389,940

MOLDING COMPOSITIONS

John K. Speicher, Newark, Del., assignor to Hercules Powder Company, Wilmington, Del., a corporation of Delaware Application May 1, 1942, Serial No. 441,391

1 Claim. (Cl. 106—169)

This invention relates to the preparation of molding compositions from cellulose derivatives and more particularly to the preparation of a plastic molding material from a slurry of thermoplastic cellulose derivatives.

In the preparation of molding powders or molded articles from thermoplastic cellulose derivatives such as cellulose acetate and ethyl cellulose, it has been the practice to prepare the material by colloiding the cellulose derivative and a plasticizer in the presence of a large amount of volatile solvent by working the material in a Werner-Pfleiderer mixer, heated rolls, etc. This method is subject to a number of disadvantages but most important is that the use of a large amount of volatile solvent is expensive particularly because a large portion of it is not recoverable.

Further, it is undesirable to keep the cellulose derivative at fairly high temperatures for long periods of time as is usually done when a Banbury mixer is used. The heat may cause deterioration of the cellulose derivative and give a product with a bad color as well as other undesirable features. Not the least important disadvantage is the necessity for having a large number of expensive pieces of equipment to carry on the process, which use considerable power per unit of product.

Now, in accordance with the present invention, a molding powder is produced by making up the cellulose derivative into a water slurry and the plasticizer in a solution of alcohol or other solvent is dispersed therein. A slurry of cellulose derivative is made up in proportions varying from 1 part by weight of the cellulose derivative flake to 4 parts of water up to 1 part of flake to 18 parts of water. A ratio of less than 1 to 4 gives a slurry which is difficult to stir properly and a ratio higher than 1 to 18 causes a considerable loss of plasticizer and dye. A ratio of from 1:8 to 1:12 is preferable for most efficient operation. While the plasticizers and coloring matter ordinarily used are not considered soluble in water, they are nevertheless slightly soluble and the larger the proportions of water the larger amounts of these ingredients will be lost.

To this slurry is added the proper amount of plasticizer solution. The plasticizer may be made up into a solution with alcohol or other solvent before adding it to the slurry. The slurry is kept in agitation as by a Lightnin mixer, propeller, or other stirring device and this agitation is continued for about one-half an hour after the addition of the plasticizer. The slurry is then allowed to settle and the water is removed from the flake.

The dye or pigment may be added with the plasticizer, after the slurry plastic is partly dried, or after it is completely dried.

Having now indicated in a general way the nature and purpose of the invention, there follows a more detailed description of preferred embodiments thereof with reference to the accompaning drawing in which is shown the various steps of the process. In one process the plasticizer and color in a suitable solvent are added to the water slurry of the cellulose derivative, the slurry agitated, the water drained off, and the material dried with agitation. In an alternative process the plasticizer is added without coloring matter and the color added to the partly dried material with proper agitation. In the other alternative the coloring matter is added after drying. While all the processes show color added at some point it will be seen that the color is not essential but rather preferable.

In the process in which the plasticizer and color in a solvent are added together, the coloring material in the form of a stable dye is dissolved in the plasticizer or solvent therefor or if in the form of a pigment it may be ground into the plasticizer.

An alternative method comprises removing the plastic from the drying trays before it is completely dry and placing it in an open end tumbling barrel, pill polisher, or drum mixer. A solution of soluble dye in alcohol or a dispersion of a pigment in plasticizer is sprayed into the rotating barrel. A smooth mixture is obtained by tumbling for fifteen minutes to one hour. The tinted mix is then returned to drying trays to complete the drying. The plastic on injection gives smooth and uniformly colored pieces. Pigments have also been made up into a suspension in a ball mill and the suspension sprayed into the rotating barrel. It is also possible merely to add the pigment or dye directly to the rotating barrel but in order to get a good dispersion a longer time of rotation is required.

In another alternative method the color is added to the completely dried material by placing the plastic and the coloring material in a tumbling barrel, pill polisher, etc.

The following are examples of carrying out the present invention:

*Example I*

Cellulose acetate flake is ground in a wet condition to a size small enough to pass through a 12-mesh sieve. 22.2 pounds of this wet cellulose acetate flake (53% acetic acid content) of 55% water content is placed in a 30-gallon drum containing 10.5 gallons of water and agitating by a Lightnin type mixer. 2.5 pounds diethyl phthalate and 2.5 pounds dimethyl phthalate were dissolved in ½ gallon of 92% denatured alcohol. 0.10 gram of Wool Fast Blue BL (color index No. 833) was also dissolved in the alcohol solution. This solution was poured into the agitated slurry and the agitation continued for 20 minutes. The slurry was allowed to settle and the supernatant liquid drained off. The flake with the absorbed plasticizer and color was drained and dried with agitation in a tray drier with a stream of air at about 50 to 60° C. The drying was continued until the flake had a water content of less than 0.7%. The dried material was injected in a standard injection machine in the form of combs, disks, bars and other molded shapes which showed excellent properties of color, hardness and impact strength.

*Example II*

Fifteen pounds of dry cellulose acetate flake (52.7% acetic acid content) were put through a .035 inch screen in a Mikro-pulverizer and then mixed with 18 gallons of water in a 55-gallon drum provided with a Lightnin mixer. In a separate container, the following ingredients were mixed:

| | |
|---|---|
| Dimethyl phthalate | 3 lbs. 9 ozs. |
| Diethyl phthalate | 3 lbs. 9 ozs. |
| Alcohol | 3 lbs. |
| Cacting Resin Yellow M | 1.07 grams |
| Rhodamine B | 0.05 grams |
| Neptune Blue | 0.05 grams |

This mixture was then gradually worked into the slurry which was agitated for about ½ hour. The water was drained off and the powder dried at 60 to 70° C. until a water content of 0.5% was reached. The powder was injection molded in various forms and showed excellent qualities of hardness, color, and impact strength.

*Example III*

Two hundred grams of ethyl cellulose capable of passing a 12-mesh screen were made into a slurry with 1,800 cc. of water. In a separate container, the following were mixed:

| | |
|---|---|
| Dibutyl phthalate | 19.05 grams |
| Methyl phthalyl ethyl glycolate | 19.05 grams |
| Alcohol solution oil soluble yellow | 10.8 cc. $^1/_{1000}$ |
| Alcohol solution oil soluble blue | 16.0 cc. $^1/_{1000}$ |
| Alcohol | 38 grams |

This mixture was added to the slurry and all the material was stirred for about ½ hour, drained, and dried at 60° C. to a water content of less than 0.7%. The powder was injection molded into various shapes and showed excellent qualities of color dispersion and uniformity.

The size of the cellulose derivative flake particles is important in order to obtain a desirable final product. The flake should be capable of passing a 12-mesh screen or preferably a 16-mesh screen in order to prevent the appearance of large uncolloided flakes in the final molded articles. Also, to reduce the tendency of some of the plasticizer to compact with fine cellulose derivative flake in the agitation of the slurry, it is desirable to keep out very fine cellulose derivative flake such as any flake which might pass about an 80-mesh screen when dry. These compacted areas have a tendency to give soft spots in the final molded powder.

It is also an important feature of the present process that the slurry water is re-used. This is for the reason that the plasticizer and dye may be slightly soluble in the water and when a certain solubility constant is reached no more of the plasticizer or dye will go into solution. Consequently, if water with a certain amount of plasticizer and dye already in solution is used in the process, it makes it less difficult to calculate the exact amount of plasticizer and dye that will be found in the final product as well as the saving of the material involved.

In order to obtain a desirable product, it is also necessary to use care in the manner of drying the molding powder. Agitated drying as on an agitated tray, agitated vacuum drier, or rotary continuous drum drier is most desirable. Agitation during drying prevents caking of such soft agglomerates as may still be present in the material. Also, without agitation, the material tends to dry unevenly. It is important also that the material should not be dried too quickly. It is desirable to dry to less than 0.7% water content. Final drying of the material may alternatively be accomplished by putting the material with a water content of about 1% through a hot plastic extruder at about 360 to 400° F., extruding preferably in the form of a ribbon which is immediately cooled and cut into granular molding powder.

The present invention has been found useful with the thermoplastic organic acid esters and ethers of cellulose and the term "thermoplastic cellulose derivative" as used herein is intended to describe these compounds. The esters include cellulose acetate, cellulose butyrate, cellulose propionate, cellulose acetate butyrate, cellulose acetate propionate, cellulose acetate-caproate, etc. The ethers include ethyl cellulose, ethyl butyl cellulose, ethyl propyl cellulose, propyl cellulose, butyl cellulose, etc.

The cellulose acetate ordinarily used is that having an acetic acid content between 52.0% and 62.5% and preferably that having an acetic acid content between 52.0% and 54.0%. The viscosity ranges of the cellulose acetate may lie between 5 and 120 seconds (falling ball method) and preferably between 60 and 120 seconds. The ethyl cellulose used has an ethoxyl content between 43.5% and 50% and preferably 46.8% to 48.5% with a viscosity between about 10 and 300 centipoises and preferably of about 100 centipoises is most useful.

The plasticizer used will depend upon the cellulose derivative used as well as the desired properties of the final product. As examples of plasticizers useful with most cellulose derivatives are: Diethyl phthalate, dimethyl phthalate, ethyl p-toluene sulfonamid, methyl phthalyl ethyl glycollate, dimethoxy ethyl phthalate, triacetin, tributylphosphate and triphenylphosphate. As examples of some of the useful dyes are the following: Blue-National Casting Resin Blue B1, General Dyestuffs Resicast Blue B, Wool Fast Blue BL, Ulich Plastic Navy Blue 1102; Red-Lithol Red, Ulich No. 1128, Cadmium Selenide Red, and General Resicast Red SFRB.

While the examples have pointed out the use of alcohol as a solvent, other solvents such as acetone, methyl acetate, ethylene dichloride, etc., may be substituted in the above examples.

There are four possible types of solvent for the plasticizer. The solvent may be miscible with water and solvent for the cellulose derivative used or non-solvent for the cellulose derivative used, or the solvent may be water immiscible and solvent for the cellulose derivative used or non-solvent for the cellulose derivative used. The first of these, that is, a solvent miscible with water and solvent for the cellulose derivative, as exemplified by acetone when used with cellulose acetate has been found preferable. The water immiscible types are not as desirable because they do not precipitate out the plasticizer as does the water miscible type.

The coloring agent used is preferably one which is soluble in the plasticizer or the solvent used but not necessarily so. The coloring agent may be one which is insoluble but if carefully distributed the results are good.

While water has been described as a medium which was used to make up the slurry, it is possible to use a wide variety of non-solvents for the cellulose derivative. In general, those liquids which are non-solvent for the cellulose derivative and which are not highly volatile at the working temperatures, nor too viscous may be used. Examples of these are mineral spirits such as gasoline, petroleum ethers, and the like.

Thus, the present invention has described a process for the manufacture of a cellulose derivative molding powder wherein the cellulose derivative and plasticizer are intimately mixed without the use of high temperatures, appreciable amounts of volatile solvents, or expensive apparatus and a molded product has been made therefrom having excellent qualities of color, hardness, and impact strength.

What I claim and desire to protect by Letters Patent is:

The process of preparing a molding powder which comprises forming a slurry of a water-insoluble thermoplastic compound selected from the group consisting of thermoplastic organic acid esters and ethers of cellulose, said compound being in flake form and having a particle size such that it passes through a 12 mesh screen and is retained by an 80 mesh screen, in 4 to 18 parts of water per part by weight of said compound; adding a solution containing a plasticizer for the thermoplastic compound, a dye, and a solvent which is water-miscible and which is a solvent for the plasticizer, dye, and thermoplastic compound, the solvent being insufficient in quantity to cause solution of the flakes of thermoplastic compound in the liquid present; agitating the resulting mixture; removing the supernatant water phase from the resulting treated flake material; and drying the solid product with agitation during the drying operation.

JOHN K. SPEICHER.